(12) United States Patent
Takimoto

(10) Patent No.: US 7,174,986 B2
(45) Date of Patent: Feb. 13, 2007

(54) EXTERNALLY DEVELOPED AIRBAG DEVICE

(75) Inventor: Takayuki Takimoto, Hikone (JP)

(73) Assignee: Takata Corporation (JP)

( * ) Notice: Subject to any disclaimer, the term of this patent is extended or adjusted under 35 U.S.C. 154(b) by 301 days.

(21) Appl. No.: 10/800,229

(22) Filed: Mar. 12, 2004

(65) Prior Publication Data

US 2004/0232663 A1   Nov. 25, 2004

(30) Foreign Application Priority Data

May 19, 2003 (JP) .............................. 2003-140631

(51) Int. Cl.
*B60K 28/10* (2006.01)
(52) U.S. Cl. ................. 180/274; 280/730.1; 280/743.2
(58) Field of Classification Search ................ 180/274, 180/271; 280/730.1, 728.1, 743.2; *B60R 21/34*
See application file for complete search history.

(56) References Cited

U.S. PATENT DOCUMENTS

| 5,588,672 | A | * | 12/1996 | Karlow et al. | ........... 280/730.2 |
| 6,140,609 | A | | 10/2000 | Jones | |
| 6,474,681 | B2 | * | 11/2002 | Peer et al. | ............... 280/730.2 |
| 6,896,288 | B2 | * | 5/2005 | Tanaka et al. | ........... 280/743.2 |
| 7,000,944 | B2 | * | 2/2006 | Bakhsh et al. | ........... 280/730.1 |
| 2003/0080541 | A1 | | 5/2003 | Kalandek et al. | |

FOREIGN PATENT DOCUMENTS

| DE | 201 19 579 U1 | 5/2002 |
| DE | 20119579 U1 * | 5/2002 |
| EP | 0 955 213 A1 | 11/1999 |
| JP | 7-108903 | 4/1995 |
| JP | 7108903 | 4/1995 |
| JP | 2000-264146 | 9/2000 |
| WO | WO-03/0022644 A1 | 3/2003 |

* cited by examiner

*Primary Examiner*—Paul N. Dickson
*Assistant Examiner*—Tiffany L. Webb
(74) *Attorney, Agent, or Firm*—Fitch, Even, Tabin & Flannery

(57) ABSTRACT

An externally developed airbag device is provided that reliably deploys along predetermined areas. More particularly, an airbag includes a bag base, which deploys along the lower edge of the windshield, and bag side segments, which deploy while extending upwardly from the right and left sides of the bag base along the exteriors of "A" pillars. Guide rods vertically extend along the exteriors of the "A" pillars. Each of the bag side segments has a connecting strap on its top that connects the bag side segment to the guide rod. The connecting straps are movable along the guide rods. The bag side segments are guided along the guide rods by the connecting straps and deploy along the exteriors of the "A" pillars.

14 Claims, 8 Drawing Sheets

FIG. 8
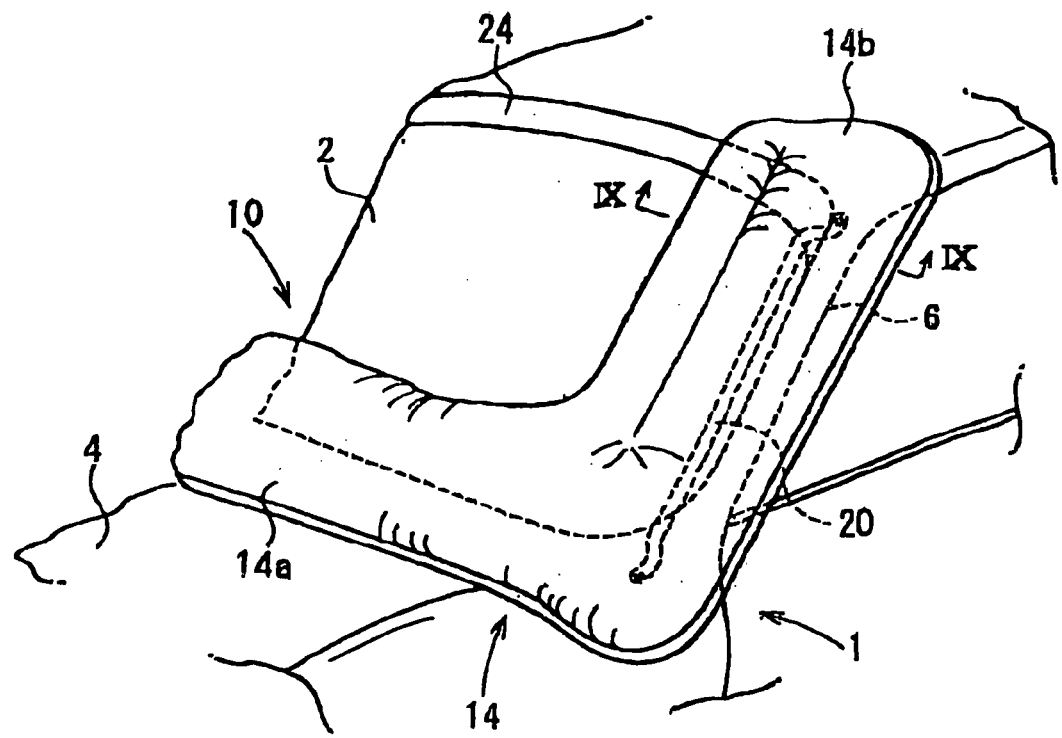
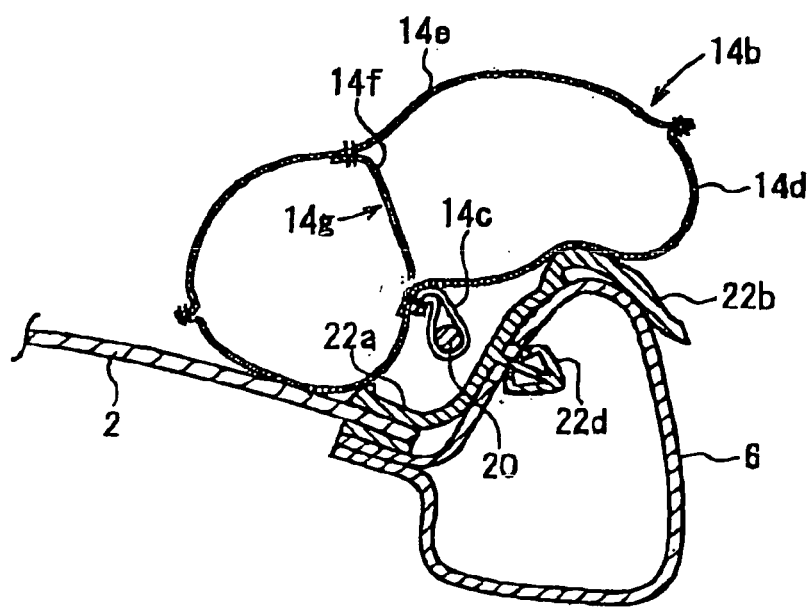
FIG. 9

HEATING MECHANISM/
WIPING MECHANISM

EXTERNALLY DEVELOPED AIRBAG DEVICE

FIELD OF THE INVENTION

The present invention relates to an externally developed airbag device of a motor vehicle for protecting pedestrians, riders on bicycles or motorcycles (hereinafter referred to as "pedestrians or the like") in the event of a collision by preventing them from directly colliding against rigid portions of the motor vehicle, such as a pillar and a fender.

BACKGROUND OF THE INVENTION

Japanese Unexamined Patent Application Publication No. 2000-264146 discloses an externally developed airbag device for protecting pedestrians or the like that prevents the pedestrians or the like from directly colliding against a "A" pillar by inflating the airbag along the right and left "A" pillars of a motor vehicle.

According to the Japanese Unexamined Patent Application Publication, when a collision with a pedestrian or the like is sensed, a gas generator discharges gas to inflate the airbag. The airbag pushes open a rear end of an engine bonnet or hood and comes out to the exterior of the vehicle, and then upwardly inflates along the right and left "A" pillars to cover the "A" pillars.

According to an externally developed airbag device disclosed in the above-described Japanese Unexamined Patent Application Publication No. 2000-264146, the airbag during the inflation process or after the inflation process is likely to deviate from the front of the "A" pillars.

SUMMARY OF THE INVENTION

Accordingly, an object of the present invention is to provide an externally developed airbag device in which an airbag reliably deploys along the predetermined areas.

An externally developed airbag device according to the present invention includes an airbag deploying along the exterior of a motor vehicle body, a gas generator for inflating the airbag, and mechanism for guiding the airbag to deploy along the predetermined areas.

In the externally developed airbag device according to the present invention, the airbag reliably deploys along the predetermined areas by the guiding mechanism. If the guiding mechanism prevent the airbag from deviating from the predetermined areas after the completion of its deployment, the deviation is avoided, for example, even if a pedestrian or the like collides with the airbag.

The present invention is preferably applied to the structure in which the airbag deploys along the exteriors of the "A" pillars; however, the present invention is not limited thereto.

According to the present invention, the guiding mechanism are preferably guide rods because of the simplicity.

Covers that cover the guide rods may be mounted to improve the appearance. In addition, the covers prevent any foreign materials from being attached to the guide rods, thereby providing considerably smooth guiding of the airbag.

According to the present invention, the mechanism for removing the foreign materials from the guiding mechanism are provided. As a result, the airbag can significantly smoothly deploy along the guiding mechanism all the time.

The mechanism for removing any foreign materials may be mechanical, such as wipers, or heating mechanism for melting snow or ice.

The heating mechanism may be electric heaters or mechanism for utilizing waste heat of, for example, the engine or the radiator.

BRIEF DESCRIPTION OF THE DRAWINGS

FIG. 8 is a perspective view showing the externally developed airbag device in a completed state of its deployment.

FIG. 9 is a cross-sectional view along line IX—IX in FIG. 8.

DETAILED DESCRIPTION OF THE PREFERRED EMBODIMENTS

Embodiments of the present invention will now be described with reference to the accompanying drawings.

Figure 1:
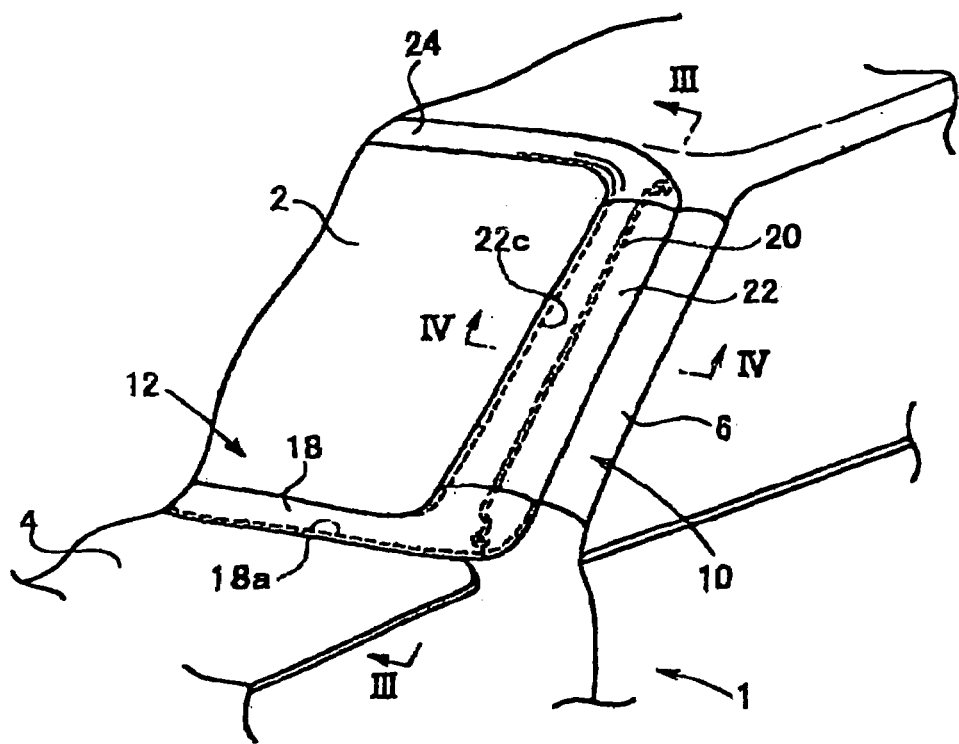
FIG. 1 is a perspective view of an externally developed airbag device according to an embodiment of the present invention in the vicinity of a pillar of the vehicle.
Figure 2:
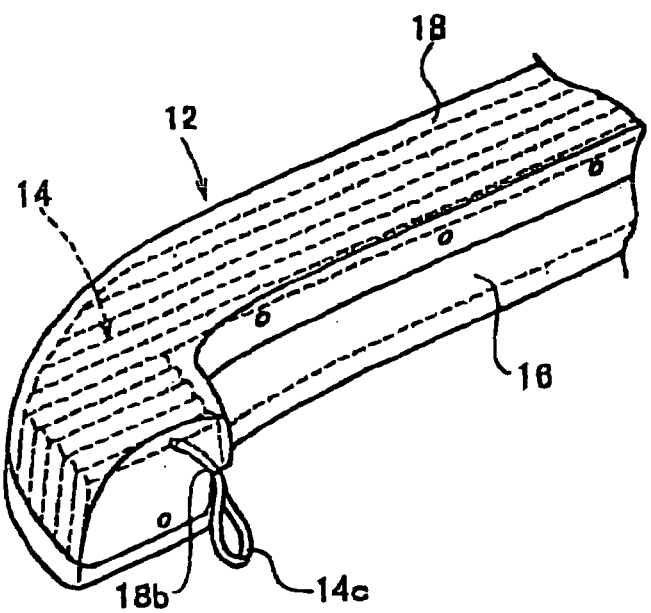
FIG. 2 is a perspective view of an airbag module.
Figure 3:
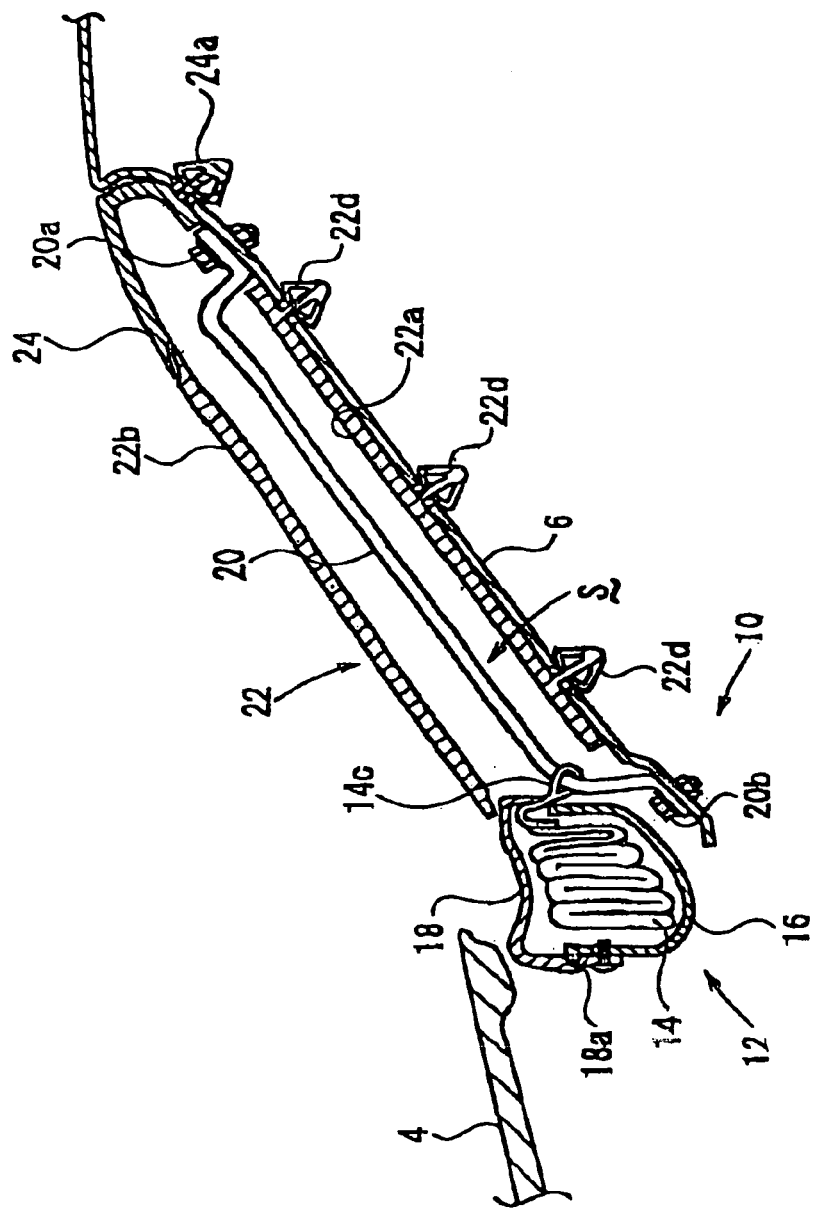
FIG. 3 is a cross-sectional view along line III—III in FIG. 1.
Figure 4:
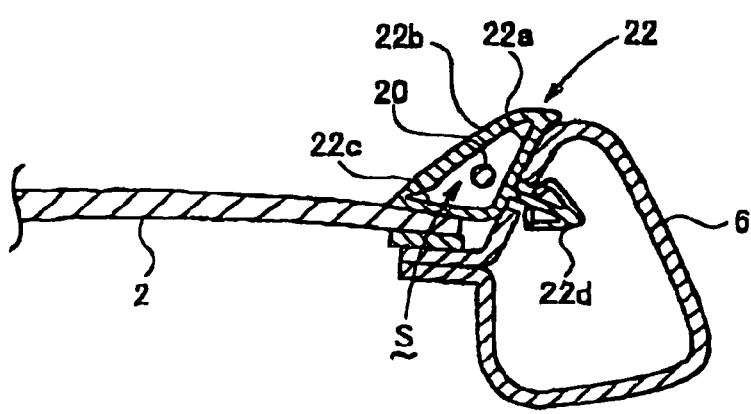
FIG. 4 is a cross-sectional view along line IV—IV in FIG. 1.
Figure 5:
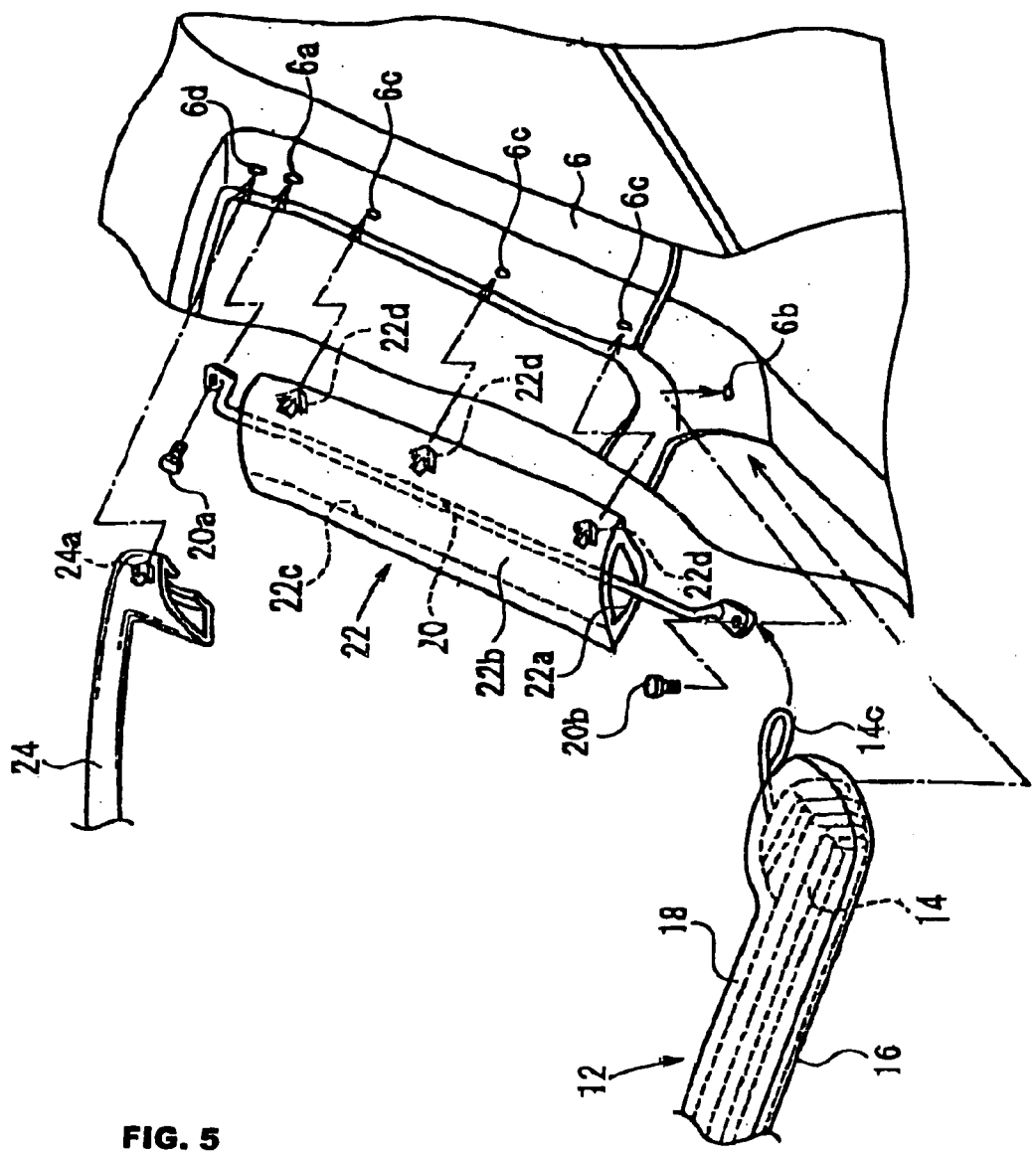
FIG. 5 is an exploded perspective view of the externally developed airbag device.
Figure 6:
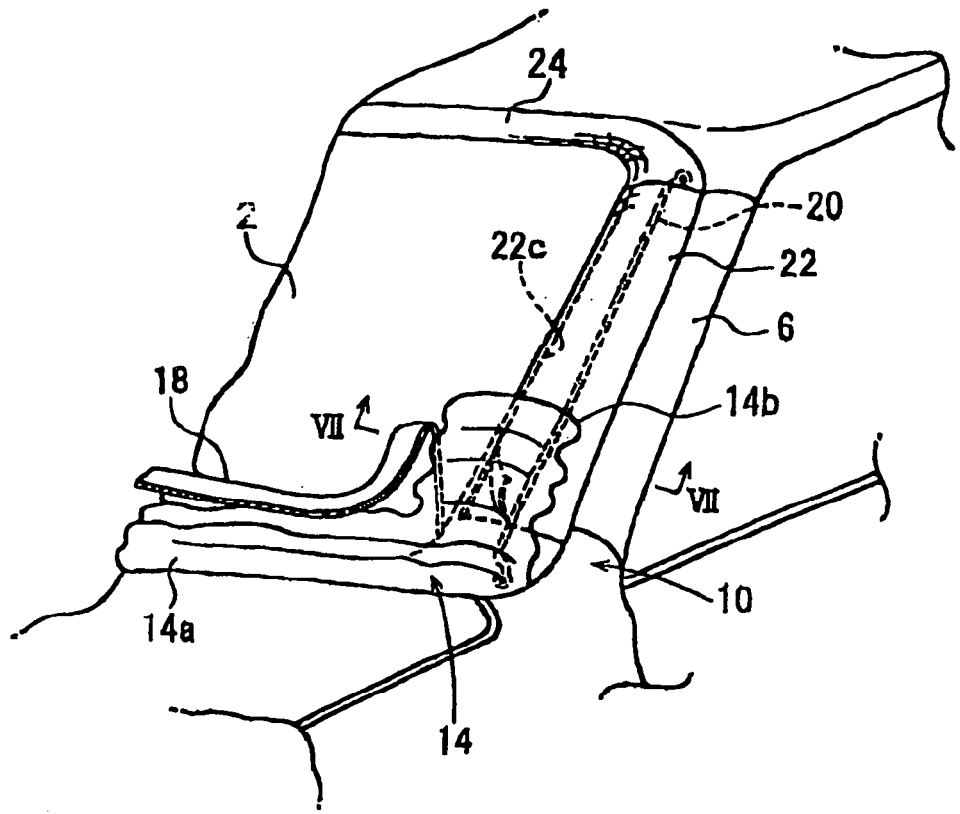
FIG. 6 is a perspective view showing the externally developed airbag device in an intermediate state of its deployment.
Figure 7:
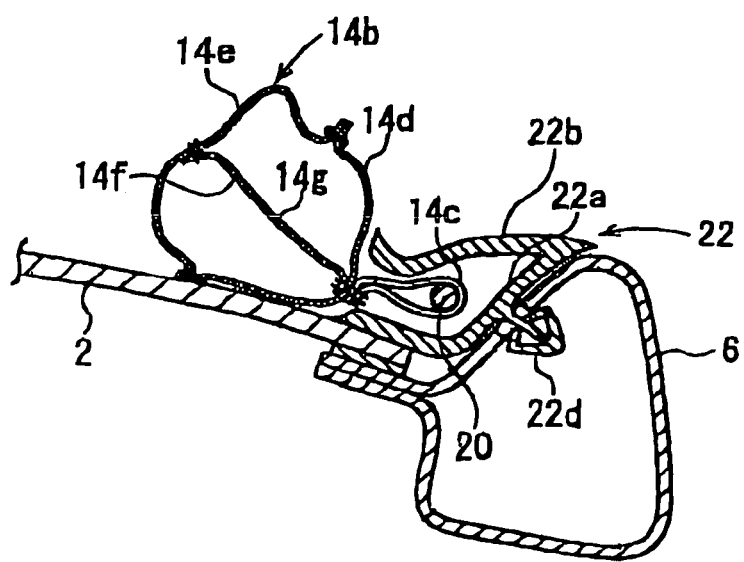
FIG. 7 is a cross-sectional view along line VII—VII in FIG. 6.

FIG. 1 is a perspective view of an externally developed airbag device according to an embodiment of the present invention in the vicinity of an "A" pillar of the vehicle. FIG. 2 is a perspective view of an airbag module in the externally developed airbag device. FIG. 3 is a cross-sectional view along line III—III in FIG. 1. FIG. 4 is a cross-sectional view along line IV—IV in FIG. 1. FIG. 5 is an exploded perspective view of the externally developed airbag device. FIG. 6 is a perspective view showing the externally developed airbag device in an intermediate state of its deployment. FIG. 7 is a cross-sectional view along line VII—VII in FIG. 6. FIG. 8 is a perspective view showing the externally developed airbag device in a completed state of its deployment. FIG. 9 is a cross-sectional view along line IX—IX in FIG. 8.

An airbag module 12 of the externally developed airbag device 10 is disposed between a lower edge of a windshield (front glass) 2 and a rear end of an engine bonnet or hood 4 of a motor vehicle 1. The airbag module 12 includes an airbag 14 that inflates to cover the periphery of the windshield 2, an open-top, box-like casing 16 accommodating the folded airbag 14, a module cover 18 disposed on the top of the casing 16, and a gas generator (not shown) to inflate the airbag. The module cover 18 has a tear line 18a. When the airbag 14 inflates, the tear line 18a is torn and the module cover 18 starts to open, thus allowing the airbag 14 to start deploying.

In this embodiment, with reference to FIG. 8, the airbag 14 includes a bag base 14a, which deploys along the lower edge of the windshield 2 in the transverse or width direction of the vehicle, and bag side segments 14b, which deploy while extending upwardly from the right and left sides of the bag base 14a along the exteriors of "A" pillars 6. Each of the bag side segments 14b has an annularly-shaped connecting strap 14c on its top which lets through a guide rod 20, which will be described hereinafter.

Additionally, with reference to FIGS. 7 and 9, the outer shell of the airbag 14 includes a lower panel 14d which is in contact with the exteriors of the windshield 2 and the "A" pillars 6, and an upper panel 14e which opposes the lower panel 14d. The lower panel 14d and the upper panel 14e are joined together about their peripheries by, for example, sewing to form a bag. Also, the lower panel 14d and the upper panel 14e are connected by a connection panel 14f inside the airbag. The connection panel 14f prevents the lower panel 14d from excessively protruding from the exteriors of the windshield 2 and the "A" pillars 6 when the airbag 14 inflates. The connection panel 14f has an opening 14g, through which chambers on the both sides of the connection panel 14f communicate, thereby allowing the air pressures in the chambers to be identical when the airbag 14 inflates.

A casing 16 is disposed along the lower edge of the windshield 2. The right and left ends are located in the vicinity of the bottom ends of the right and left "A" pillars 6, respectively. The bag base 14a of the airbag 14 is connected to the interior of the casing 16. The casing 16 accommodates the airbag 14, where the right and left bag side segments 14b are folded from their tops towards the bag base 14a in a zigzag fashion and the bag base 14a is folded in a zigzag fashion in the length direction of the vehicle to become a transversely long folded structure whose long edge is oriented in the width direction of the vehicle.

With reference to FIG. 2, the right and left ends of the module cover 18 have small notch-like openings 18b. The connecting straps 14c are pulled out of the casing 16 through the small openings 18b.

Each of the "A" pillars 6 has the guide rod 20 that guides the deployment of each bag side segment 14b of the airbag 14. The guide rod 20 is a straight bar that substantially vertically extends along the exterior of the "A" pillar 6. The top and bottom ends of the guide rod 20 are secured to the top and bottom ends of the "A" pillar 6 by a blind rivet 20a and a bolt 20b, respectively. The blind rivet 20a and the bolt 20b are fixed to holes 6a and 6b shown in FIG. 5, respectively.

The connecting straps 14c loosely surround the guide rods 20 and are movable along the guide rods 20.

Each of the "A" pillars 6 has a cover 22 which covers the guide rod 20. In this embodiment, the cover 22 has a base section 22a that is in contact with the exterior of the "A" pillar 6 and a cover section 22b that covers the guide rod 20 at the front thereof. The right edges of the base section 22a and the cover section 22b are seamlessly connected and the same for the left edges thereof. A space S surrounded by the base section 22a and the cover section 22b produces a through-hole inside the cover 22 extending along the "A" pillar 6. The guide rod 20 is disposed in the space S. With reference to FIG. 4, the base section 22a is mounted so that it covers the joint line of the "A" pillar 6 and the windshield 2, thus functioning as a weather strip.

In this embodiment, a tear line 22c extends on the back side surface of the cover section 22b along the windshield 2 side edge of the cover section 22b. The tear line 22c is torn by the connecting strap 14c while the connecting strap 14c slides along the guide rod 20, thus allowing the connecting strap 14c to move. The position of the tear line 22c is not limited thereto. It may be formed substantially at the center of the cover section 22b in the transverse direction.

To secure the cover 22 to the "A" pillar 6, a plurality of snap fasteners 22d (three in this embodiment) are arranged at some intervals along the "A" pillar 6 extending direction to protrude from the back surface of the cover section 22b. The snap fasteners 22d are engaged with holes 6c shown in FIG. 5.

With reference to FIG. 5, when the guide rod 20 and the cover 22 are attached to the "A" pillar 6, the guide rod 20 is inserted into the cover 22 and the connecting strap 14c is let through the guide rod 20 beforehand. Then, the top and bottom ends of the guide rod 20 are secured to the "A" pillar 6 by the blind rivet 20a and the bolt 20b. Subsequently, the snap fasteners 22d are pushed into the corresponding holes 6c to secure the cover 22 to the "A" pillar 6.

As shown in FIG. 5, the length of the guide rod 20 is greater than the length, from the top end to the bottom end, of the cover 22. Accordingly, both end portions of the guide rod 20 protrude from the ends of the cover 22. In this embodiment, after the guide rod 20 and the cover 22 are attached to the "A" pillar 6, an upper cover 24 is mounted to be aligned to the upper edge of the windshield 2. The upper cover 24 is designed so that the right and left end portions of the upper cover 24 cover the top ends of the right and left "A" pillars, respectively. The upper cover 24 also covers the top portions of the guide rods 20 that protrude from the top ends of the covers 22.

Snap fasteners 24a are arranged to protrude from the back surface of the upper cover 24. The snap fasteners 24a are engaged with holes 6d which are disposed at the top ends of the "A" pillars 6 and at the upper portion of the windshield 2 to secure the upper cover 24.

With reference to FIGS. 1 and 3, the airbag module 12 is disposed so that the right and left ends of the module cover 18 are positioned in the vicinity of the lower sides of the covers 22. The bottom end portions of the guide rods 20 are covered by the module cover 18.

In this embodiment, with reference to FIG. 1, the right and left covers 22, the upper cover 24, and the module cover 18 look like one cover surrounding the periphery of the windshield 2.

Additionally, a sensor (not shown) is mounted in the front bumper or near the bumper of the motor vehicle 1 to sense or predict a collision between a pedestrian or the like and the motor vehicle 1. The externally developed airbag device 10 has a control circuit to instruct the above-described gas generator to discharge gas when triggered by the sensor signal.

In this externally developed airbag device 10, when the sensor senses or predicts a collision between a pedestrian or the like and the motor vehicle 1, the gas generator discharges gas when triggered by the sensor signal and the airbag 14 starts to inflate by the gas from the gas generator. Subsequently, the bag base 14a pushes open the module cover 18 to deploy while covering the lower edge of the windshield 2, and the bag side segments 14b deploy while upwardly protruding from the right and left ends of the bag base 14a along the exteriors of the "A" pillars 6.

During the deployment, the top end of each bag side segments 14b is guided to the guide rod 20 by the connecting strap 14c. As the bag side segment 14b upwardly deploys, the connecting strap 14c moves to the top end of the guide rod 20 while tearing off the cover 22. Since the bag side segment 14b is connected to the guide rod 20 via the connecting strap 14c, the bag side segment 14b deploys along the guide rod 20, thus reliably covering the exterior of the "A" pillar 6. In addition, the bag side segment 14b is connected to the guide rod 20 via the connecting strap 14c even after the completion of its deployment. As a result, even if a pedestrian or the like collides with the bag side segments 14b, the shift to the right or left due to the load from a pedestrian or the like is prevented, thus reliably holding and protecting the pedestrian or the like.

In this embodiment, since the guide rods 20 are used for guiding the deployments of the bag side segments 14b, the structure of the externally developed airbag device 10 is simplified.

In this embodiment, since the guide rods 20 are covered by the covers 22, the upper cover 24, and the module cover 18, the appearance of the motor vehicle 1 is improved. Additionally, the covers 22, 24, and 18 prevent any foreign materials from attaching to the guide rods 20. As a result, the bag side segments 14b are smoothly guided by the guide rods 20 all the time.

Figure 10:
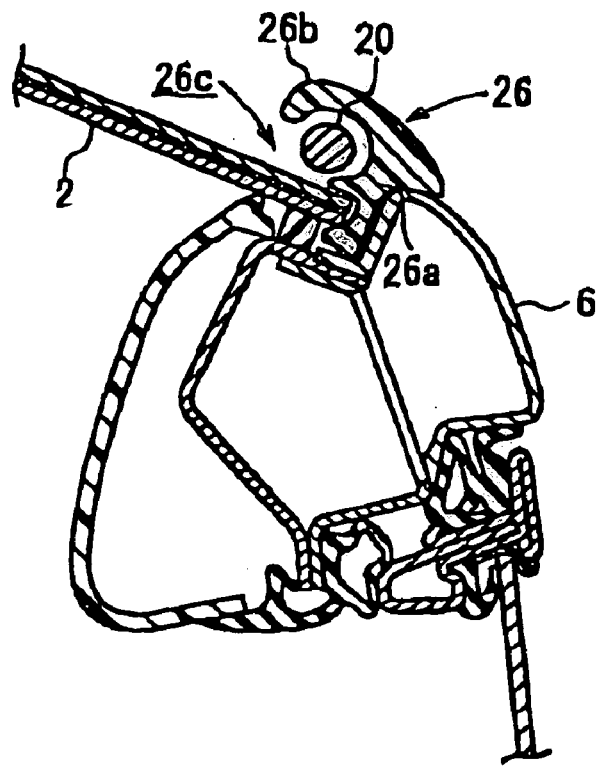
FIG. 10 is a cross-sectional view of another structure of a cover.
Figure 11:
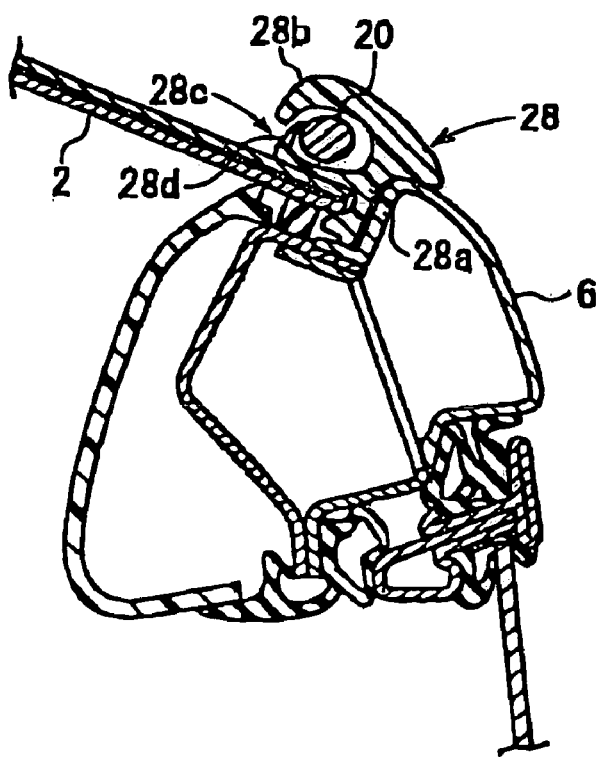
FIG. 11 is a cross-sectional view of another structure of a cover.
Figure 12:
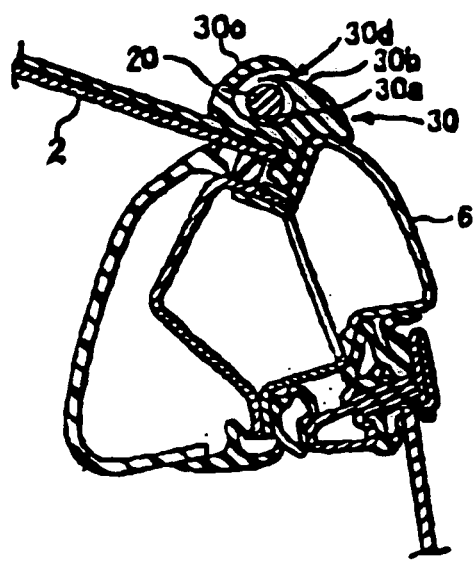
FIG. 12 is a cross-sectional view of another structure of a cover.

In this embodiment, as shown in FIG. 4, each of the covers 22 surrounds the guide rod 20 and allows the connecting strap 14c to move along the guide rod 20 by being torn by the connecting strap 14c. However, like the covers 26, 28, and 30 shown in FIGS. 10 to 12, the covers may have pre-installed open parts that allow the connecting straps 14c to move. FIGS. 10 to 12 are substantially transverse sectional views of the "A" pillar 6 which illustrate the structures of the cover 26, 28, and 30, respectively.

With reference to FIG. 10, each of the covers 26 has a base section 26a that is in contact with the exterior of the "A" pillar 6 and a cover section 26b that covers the guide rod 20 at the front thereof (the upper side in FIG. 10). In this embodiment, the outer side edges of the base section 26a and the cover section 26b (the opposite side edges to the windshield 2) are connected while the inner side edges of the base section 26a and the cover section 26b (the windshield 2 side edges) are separated. An open part 26c, which is a gap between the inner side edges of the base section 26a and the cover section 26b, allows the connecting strap 14c (not shown in FIG. 10) to move along the guide rod 20.

The cover 26 having the pre-installed open part 26c, which allows the connecting strap 14c to move along the guide rod 20, more smoothly moves the connecting strap 14c along the guide rod 20.

With reference to FIG. 11, each of the covers 28 also has a base section 28a that is in contact with the exterior of the "A" pillar 6 and a cover section 28b that covers the guide rod 20 at the front thereof (the upper side in FIG. 11). Like the above-described embodiment, the outer side edges of the base section 28a and the cover section 28b are connected while the inner side edges of the base section 28a and the cover section 28b are separated. An open part 28c, which is a gap between the inner side edges of the base section 28a and the cover section 28b, allows the connecting strap 14c (not shown in FIG. 11) to move along the guide rod 20.

In this embodiment, a protrusion 28d is arranged to protrude from the inner side edge of the base section 28a towards the inner side edge of the cover section 28b. The protrusion 28d extends across the open part 28c and the top end of the protrusion 28d extends past the side edge of the cover section 28b on the inner side of the cover 28. In FIG. 11, the protrusion 28d is separated from the side edge of the cover section 28b; however, both may be in contact with each other.

The protrusion 28d of the cover 28 suppresses or prevents any foreign materials from entering the interior of the cover 28 through the open part 28c.

With reference to FIG. 12, each of the covers 30 has a base section 30a that is in contact with the exterior of the "A" pillar 6 and half cover sections 30b and 30c that are arranged to protrude from the inner and outer side edges of the base section 30a while each wrapping the guide rod 20 at the front thereof (the upper side in FIG. 12). An open part 30d, which is a gap between the top ends of the half cover sections 30b and 30c, allows the connecting strap 14c (not shown in FIG. 12) to move along the guide rod 20.

In this embodiment, the top portion of the half cover section 30b overlaps the back side of the top portion of the half cover section 30c, thus suppressing or preventing any foreign materials from entering the interior of the cover 30 through the open part 30d. In FIG. 12, the top portion of the half cover section 30b is separated from the top portion of the half cover section 30c; however, both may be in contact with each other.

In the covers 26, 28, and 30 shown in FIGS. 10 to 12, the base section 26a, 28a, or 30a is mounted so that it covers the joint line of the "A" pillar 6 and the windshield 2, thus functioning as a weather strip.

Figure 13:
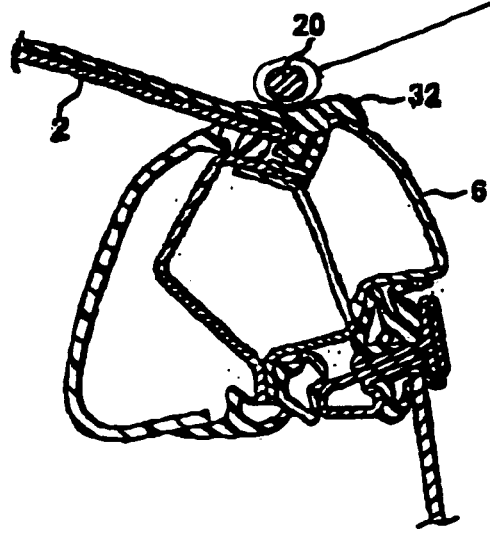
FIG. 13 is a cross-sectional view of one embodiment without a cover.

According to the present invention, with reference to FIG. 13, the covers which cover the guide rods may be removed. According to an embodiment shown in FIG. 13, the guide rod 20 is externally exposed. A weather strip 32 is mounted to cover the joint line of the "A" pillar 6 and the windshield 2 instead of the cover. FIG. 13 is a substantially transverse sectional view of the same portions in FIGS. 10 to 12.

According to the present invention, mechanism for removing the foreign materials from the guide rods may be provided. This structure allows the airbag to more smoothly move along the guide rod all the time.

The mechanism for removing the foreign materials may be mechanical, such as wipers, or may be heating mechanism for removing snow or ice by melting. The heating mechanism may be electric heaters or mechanism for utilizing waste heat of, for example, the engine or the radiator.

The above-described embodiments are only examples of the present invention. The present invention can be applied to other applications. For example, while the airbag deploys along the exteriors of the "A" pillars in the above-described embodiments, the present invention can be applied to the applications where the airbag deploys in another area.

As stated above, the present invention provides an externally developed airbag device that reliably deploys along the predetermined area.

What is claimed is:
1. An airbag device comprising:
   an airbag for being inflated in a predetermined direction upon deployment;
   a guide that cooperates with the airbag causing the airbag to deploy in the predetermined direction as the airbag is being inflated;
   a cover for the guide;
   a follower of the airbag that rides along the guide during airbag inflation; and
   a frangible portion of the cover that is ruptured upon airbag deployment.

2. The airbag device of claim 1 wherein the airbag includes at least one panel and a follower associated with the panel and the guide for causing airbag deployment in the predetermined direction.

3. The airbag device of claim 2 wherein the guide comprises an elongated member for being attached to a vehicle portion along which the airbag is to deploy, and the follower comprises an annular member extending about the elongate member for riding therealong as the airbag is deployed.

4. The airbag device of claim 1 wherein the airbag includes a casing in which the airbag is folded prior to deployment and the casing has a cover that is opened as the airbag is inflated, and the cover for the guide is configured to protect the guide against fouling with foreign materials.

5. The airbag device of claim 1 wherein the follower ruptures the guide cover frangible portion as the follower rides along the guide.

6. The airbag device of claim 1 wherein the airbag has a generally U-shaped configuration including a base portion and opposite side portions with the guide causing the airbag side portions to deploy in the predetermined direction.

7. The airbag device of claim 1 wherein the guide includes a guide rod, and the cover has a base section adapted for being engaged against a vehicle, a cover section including the frangible portion, and a through opening formed by the base section and the cover section in which the guide rod extends.

8. An externally developed airbag device for being deployed along pillars on either side of a vehicle windshield, the externally developed airbag device comprising:

an airbag that includes portions deployed along each pillar;

a casing in which the airbag is stowed prior to deployment;

elongated guide members that extend along respective vehicle pillars;

followers of the airbag portions that ride along the respective guide members as the airbag is inflated;

elongated covers separate from the airbag casing each configured to form a space in which the respective elongated guide members extend; and a separable portion of each elongated cover that are opened upon deployment of the airbag portions.

9. The externally developed airbag device of claim 8 wherein the guide members comprise rods and the followers comprise annular straps.

10. The externally developed airbag device of claim 9 wherein the casing includes openings adjacent the rods with the straps extending through the openings prior to airbag deployment.

11. The externally developed airbag device of claim 8 wherein the separable portions of the covers each include a longitudinally extending tear line with the respective followers rupturing the guide cover tear lines as the followers ride along the associated guide members.

12. The externally developed airbag device of claim 8 wherein the covers each include a base section that is configured to be secured to the vehicle to span a joint line formed between the pillars and windshield, and a cover section cooperating with the base section to form the space for the guide members.

13. The externally developed airbag device of claim 8 including a removal mechanism for substantially keeping the guide members free of foreign materials.

14. An externally developed airbag device for being deployed along pillars on either side of a vehicle windshield, the externally developed airbag device comprising:

an airbag that includes portions deployed along each pillar;

elongate guide members that extend along respective vehicle pillars;

followers of the airbag portions that ride along the respective guide members as the airbag is inflated; and a removal mechanism for substantially keeping the guide members free of foreign materials, wherein the removal mechanism comprises either a wiping mechanism or a heating mechanism.

* * * * *